(12) United States Patent  
Shakespeare et al.

(10) Patent No.: US 8,420,252 B2  
(45) Date of Patent: Apr. 16, 2013

(54) BATTERY LAYOUT INCORPORATING FULL METAL EDGE SEAL

(75) Inventors: Stuart Kevin Shakespeare, Mayer, MN (US); Stanley Jacob Stanislowski, Elk River, MN (US); Debra Ann Holmquist, Elk River, MN (US); Darren Kroells, Golden Valley, MN (US); Matthew Flatland, Elk River, MN (US); Theodore L. Flemmer, Elk River, MN (US); Steven J. McKinley, Cottage Grove, MN (US)

(73) Assignee: Cymbet Corporation, Elk River, MN (US)

( * ) Notice: Subject to any disclaimer, the term of this patent is extended or adjusted under 35 U.S.C. 154(b) by 1064 days.

(21) Appl. No.: 12/371,706

(22) Filed: Feb. 16, 2009

(65) Prior Publication Data

US 2009/0214899 A1    Aug. 27, 2009

Related U.S. Application Data

(60) Provisional application No. 61/067,288, filed on Feb. 27, 2008.

(51) Int. Cl.  
*H01M 6/12* (2006.01)  
*H01M 2/10* (2006.01)

(52) U.S. Cl.  
USPC .............. 429/162; 429/7; 429/171; 429/177; 429/163; 429/185

(58) Field of Classification Search .............. 429/7, 162, 429/163, 171, 177, 185  
See application file for complete search history.

(56) References Cited

U.S. PATENT DOCUMENTS

| 5,314,765 A | 5/1994 | Bates |
| 5,338,625 A | 8/1994 | Bates et al. |

(Continued)

FOREIGN PATENT DOCUMENTS

| JP | 59146151 | 8/1984 |
| WO | WO2004/093223 | 10/2004 |

(Continued)

OTHER PUBLICATIONS

International Search Report, mailed May 27, 2009 (5 pgs).

*Primary Examiner* — Yogendra Gupta  
*Assistant Examiner* — Jeremiah Smith  
(74) *Attorney, Agent, or Firm* — Kagan Binder, PLLC

(57) ABSTRACT

A first current collector on the first surface of the substrate and a second current collector having a first surface and a perimeter. One of the first and second current collector is an anode current collector and the other is a cathode current collector. The battery also comprises a cathode material having a perimeter, the cathode material being located on the cathode current collector; an electrolyte layer having a perimeter, the electrolyte separating the cathode material from the anode current collector; an insulation layer having a perimeter, the insulation layer together with the electrolyte layer separating the anode current collector from the cathode material and the cathode current collector. A first passivation layer generally overlies at least the perimeter of the cathode material, the perimeter of the electrolyte, and the perimeter of the insulation layer, the first passivation layer being electrically coupled to the first current collector and forming a continuous metal to metal seal around a defined area of the first current collector. The first passivation layer has a via opening. A second passivation layer is electrically coupled to the second current collector through the via opening of the first passivation layer.

14 Claims, 1 Drawing Sheet

U.S. PATENT DOCUMENTS

| | | |
|---|---|---|
| 5,445,906 A | 8/1995 | Hobson et al. |
| 5,512,147 A | 4/1996 | Bates et al. |
| 5,561,004 A | 10/1996 | Bates et al. |
| 5,567,210 A | 10/1996 | Bates et al. |
| 5,569,520 A | 10/1996 | Bates |
| 5,597,660 A | 1/1997 | Bates et al. |
| 5,612,152 A | 3/1997 | Bates |
| 5,654,084 A | 8/1997 | Egert |
| 5,705,293 A | 1/1998 | Hobson |
| 6,866,901 B2 | 3/2005 | Burrows et al. |
| 6,998,221 B2 | 2/2006 | Kirmse |
| 7,241,533 B1 * | 7/2007 | Ikeda et al. .......... 429/233 |
| 2002/0037756 A1 | 3/2002 | Jacobs et al. |
| 2005/0147877 A1 | 7/2005 | Tarnowski et al. |
| 2007/0015060 A1 | 1/2007 | Klaassen |
| 2007/0139001 A1 * | 6/2007 | Hahn .................. 320/112 |
| 2009/0155685 A1 | 6/2009 | Salot et al. |

FOREIGN PATENT DOCUMENTS

| | | |
|---|---|---|
| WO | WO2006/128174 | 11/2006 |
| WO | WO2007/145392 | 12/2007 |

* cited by examiner

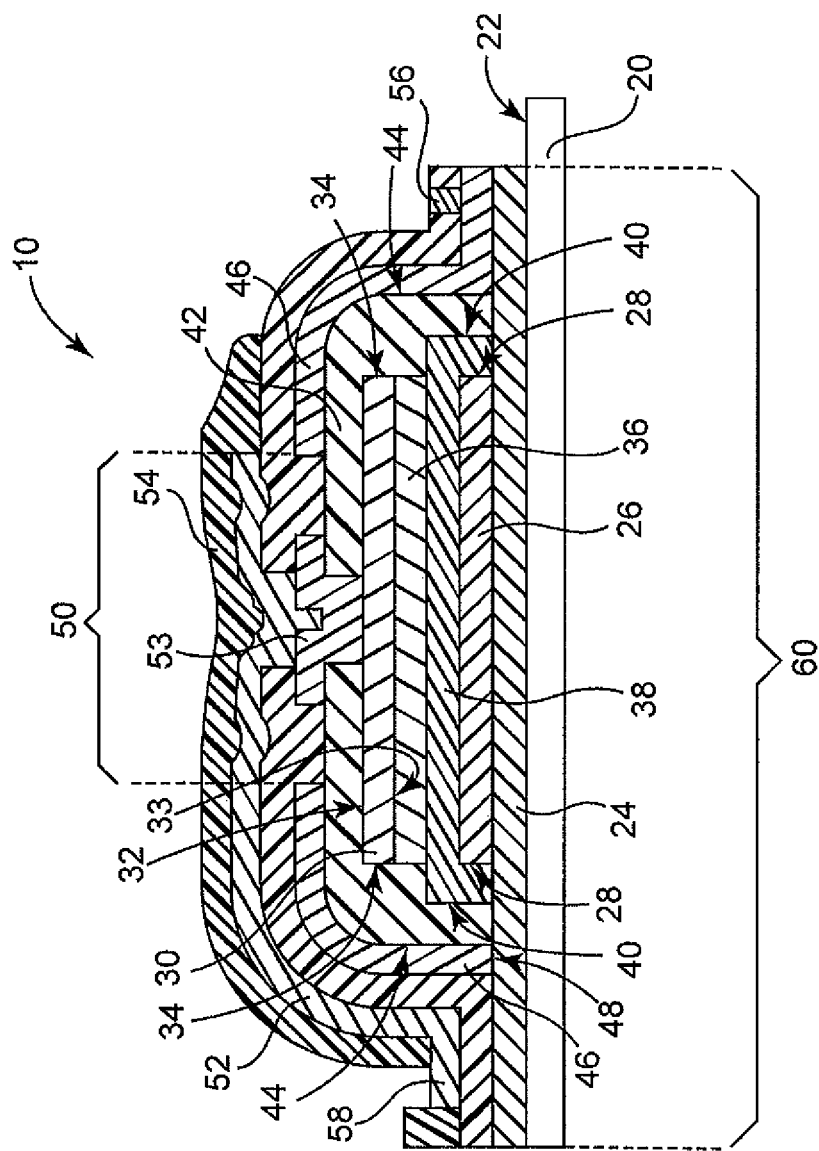

BATTERY LAYOUT INCORPORATING FULL METAL EDGE SEAL

This application claims the benefit of U.S. Provisional Application Ser. No. 61/067,288 filed on Feb. 27, 2008, entitled "BATTERY LAYOUT INCORPORATING FULL METAL EDGE SEAL," which application is incorporated herein by reference in its entirety.

FIELD OF THE INVENTION

This invention relates to the field of thin-film solid-state energy-storage devices, and more specifically to construction and design of thin-film solid-state batteries.

BACKGROUND OF THE INVENTION

Electronics have been incorporated into many portable devices such as computers, mobile phones, tracking systems, scanners, etc. One drawback to portable devices is the need to include the power supply with the device. Portable devices typically use batteries as power supplies. Batteries must have sufficient capacity to power the device for at least the length of time the device is in use. Sufficient battery capacity can result in a power supply that is quite heavy and/or large compared to the rest of the device. Accordingly, smaller and lighter batteries (i.e., power supplies) with sufficient energy storage are desired. Other energy storage devices, such as supercapacitors, and energy conversion devices, such as photovoltaics and fuel cells, are alternatives to batteries for use as power supplies in portable electronics and non-portable electrical applications.

Another drawback of conventional batteries is the fact that some are fabricated from potentially toxic materials that may leak and be subject to governmental regulation. Accordingly, it is desired to provide an electrical power source that is safe, solid-state and rechargeable over many charge/discharge life cycles.

One type of an energy-storage device is a solid-state, thin-film battery. Examples of thin-film batteries are described in U.S. Pat. Nos. 5,314,765; 5,338,625; 5,445,906; 5,512,147; 5,561,004; 5,567,210; 5,569,520; 5,597,660; 5,612,152; 5,654,084; and 5,705,293, each of which is herein incorporated by reference. U.S. Pat. No. 5,338,625 describes a thin-film battery, especially a thin-film microbattery, and a method for making same having application as a backup or first integrated power source for electronic devices. U.S. Pat. No. 5,445,906 describes a method and system for manufacturing a thin-film battery structure formed with the method that utilizes a plurality of deposition stations at which thin battery component films are built up in sequence upon a web-like substrate as the substrate is automatically moved through the stations.

US Patent Application Publication No. 2005/0147877 describes a thin-film battery such as one that includes lithium or lithium compounds connected to an electronic circuit. An environmental barrier is deposited as alternating layers, at least one of the layers providing a smoothing, planarizing, and/or leveling physical-configuration function, and at least one other layer providing a diffusion-barrier function.

There is a need for a battery that is reliable, has a long shelf life, and can be made inexpensively and mass-produced. There is still a further need for smaller and lighter batteries (i.e., power supplies) with sufficient energy storage that can be packaged with electronics to accomplish at least one function. There is also a need for improved protection against detrimental exposure of sensitive components to the environment.

SUMMARY OF THE INVENTION

The present invention provides a thin film battery that comprises a substrate having a first surface; a first current collector on the first surface of the substrate and a second current collector having a first surface and a perimeter. One of the first and second current collector is an anode current collector and the other is a cathode current collector. The battery also comprises a cathode material having a perimeter, the cathode material being located on the cathode current collector; an electrolyte layer having a perimeter, the electrolyte separating the cathode material from the anode current collector; an insulation layer having a perimeter, the insulation layer together with the electrolyte layer separating the anode current collector from the cathode material and the cathode current collector. A first passivation layer generally overlies at least the perimeter of the cathode material, the perimeter of the electrolyte, and the perimeter of the insulation layer, the first passivation layer being electrically coupled to the first current collector and forming a continuous metal to metal seal around a defined area of the first current collector. The first passivation layer has a via opening. A second passivation layer is electrically coupled to the second current collector through the via opening of the first passivation layer. In a preferred embodiment of this thin film battery construction, the first current collector is the cathode current collector and the second current collector is the anode current collector.

In another embodiment of the present invention, a thin film battery comprises a substrate having a first surface; and first current collector on the first surface of the substrate. A first passivation layer is electrically coupled to the first current collector and forms a continuous metal to metal seal around a defined area of the first current collector, the first passivation layer having a via opening. The first passivation layer and the first current collector define a generally enclosed area. The battery additionally comprises a cathode material and a second current collector, wherein one of the first and second current collector is an anode current collector and the other is a cathode current collector. An electrolyte layer is provided that separates the cathode material from the anode current collector. An insulation layer is also provided that, together with the electrolyte layer, separates the anode current collector from the cathode material and the cathode current collector. The cathode material, second current collector, electrolyte layer and insulation layer are disposed within the enclosed area defined by the first passivation layer and the first current collector. The battery additionally comprises a second passivation layer electrically coupled to the second current collector through the via opening of the first passivation layer.

This unique construction of the thin film battery provides exceptional coverage and protection of, in particular, the sides of the battery, by providing a complete metal to metal boundary seal around the entire battery perimeter. This layout prevents adverse environmental exposure of edges of adjacent metal and non-metal layers that would provide a direct lateral pathway to sensitive components of the battery construction along a metal/non-metal interface.

BRIEF DESCRIPTION OF THE DRAWINGS

The accompanying drawings, which are incorporated in and constitute a part of this application, illustrate several aspects of the invention and together with a description of the embodiments serve to explain the principles of the invention. A brief description of the drawings is as follows:

FIG. 1 shows a cross-sectional view of a battery that is an embodiment of the present invention.

DETAILED DESCRIPTION OF PRESENTLY PREFERRED EMBODIMENTS

The embodiments of the present invention described below are not intended to be exhaustive or to limit the invention to the precise forms disclosed in the following detailed description. Rather a purpose of the embodiments chosen and described is so that the appreciation and understanding by others skilled in the art of the principles and practices of the present invention can be facilitated.

Terminology

In this description, the term metal applies both to substantially pure single metallic elements and to alloys or combinations of two or more elements, at least one of which is a metallic element.

The term substrate or core generally refers to the physical structure that is the basic work piece that is transformed by various process operations into the desired microelectronic configuration. In some embodiments, substrates include conducting material (such as copper, stainless steel, aluminum and the like), insulating material (such as sapphire, ceramic, or plastic/polymer insulators and the like), semiconducting materials (such as silicon), nonsemiconducting, or combinations of semiconducting and non-semiconducting materials. In some other embodiments, substrates include layered structures, such as a core sheet or piece of material (such as iron-nickel alloy and the like) chosen for its coefficient of thermal expansion (CTE) that more closely matches the CTE of an adjacent structure such as a silicon processor chip. In some such embodiments, such a substrate core is laminated to a sheet of material chosen for electrical and/or thermal conductivity (such as a copper, aluminum alloy and the like), which in turn is covered with a layer of plastic chosen for electrical insulation, stability, and embossing characteristics.

An electrolyte is a material that conducts electricity by allowing movement of ions (e.g., lithium ions having a positive charge) while being non-conductive to electrons. An electrical cell or battery is a device having an anode and a cathode that are separated by an electrolyte. A dielectric is a material that is non-conducting to electricity, such as, for example, plastic, ceramic, or glass. In some embodiments, a material such as LiPON can act as an electrolyte when a source and sink for lithium are adjacent the LiPON layer, and can also act as a dielectric when placed between two metal layers such as copper or aluminum, which do not form ions that can pass through the LiPON. In some embodiments, devices include an insulating plastic/polymer layer (a dielectric) having wiring traces that carry signals and electrical power horizontally, and vias that carry signals and electrical power vertically between layers of traces.

The term via opening, as used herein, is defined to include all openings, including trenches, vias and contact openings, formed in a layer in the present battery device. Accordingly, the present invention is not limited only to traditional via structures.

The term vertical is defined to mean substantially perpendicular to the major surface of a substrate. Height or depth refers to a distance in a direction perpendicular to the major surface of a substrate.

The term "layer containing lithiated compounds" is defined to mean a layer that contains lithium in any form, including metallic lithium, alloys of lithium and lithium containing compounds. Examples of layers containing lithiated compounds include the anode, particularly in the case of metallic lithium, the electrolyte, particularly in the case of LiPON, and the cathode, particularly where the cathode layer is a material such as $LiCoO_2$ that can act as a source of lithium ions. In a preferred embodiment, the anode, electrolyte and cathode are all lithiated compounds.

As used herein, LiPON refers generally to lithium phosphorus oxynitride materials. One example is $Li_3PO_4N$. Other examples incorporate higher ratios of nitrogen in order to increase lithium ion mobility across the electrolyte.

In preferred embodiments, the layer containing lithiated compounds is a cathode material or is an electrolyte. In an embodiment of the present invention, the thin film battery is initially constructed without an anode, but with a cathode layer that can act as a source of lithium ions. Upon charging of this thin film battery embodiment, metallic lithium is plated between the electrolyte and the anode current collector to form an anode.

It will be understood that in one aspect of the invention, the battery is built in layers as a "bottom up" construction, whereby the substrate is provided, in order, with a cathode current collector, a cathode, a solid electrolyte, an anode (which is optional during the construction phase as discussed above), an anode current collector, and one or more encapsulant materials. Optionally, the cathode and anode may be provided in a side by side or other configuration. Alternatively, the battery may be constructed in the reverse order from that discussed above, so that the anode current collector is the located on the bottom of the battery adjacent the substrate. This configuration is less favored in the embodiment where the anode is formed upon charging, because this anode formation in certain embodiments will necessitate movement of most of the layers of the battery to accommodate formation of the anode. Alternatively, the layers may be formed separately and joined by a lamination process as will now be readily envisioned by the routineer in this art.

Turning now to the drawings, wherein like numbers represent like parts, FIG. 1 shows a cross-sectional view of a battery 10 that is an embodiment of the present invention. Note that the figures used herein are not to scale: the vertical thicknesses of the thin-film batteries described are extremely thin (e.g., less than about 10 microns, in some embodiments, and even less than 4 microns in other embodiments) as compared to the device lateral widths (e.g., 1000 microns (=1 mm) to 10,000 microns (=10 mm) in some embodiments, and up to several centimeters in other embodiments). Further, the trenches in some embodiments of the present invention are about 10 microns or less wide. The embodiment as described shows the cathode current collector being located on the substrate. As noted above, a reverse configuration of the thin film battery is specifically contemplated, as will be understood by the routineer having reference to the present disclosure.

Battery 10 comprises a substrate 20 having a first surface 22. In some embodiments, substrate 20 is about 500 microns (or thinner) to about 1000 microns (or thicker) thick (e.g., 525 or 625 microns of silicon wafer, in some embodiments). In other embodiments, substrate 20 includes a polymer layer (e.g., Kapton) that can be as thin as 25 microns or thinner.

Cathode current collector 24 is located on the first surface 22 of substrate 20, and is made from a conductive material (such as copper, aluminum, nickel, iron, gold, silver, platinum, molybdenum, manganese, metal alloys, conductive ceramics, conductive semiconductors such as heavily doped polycrystalline silicon, and the like.) and is chosen so that it does not migrate into the cathode. In embodiments of the present invention, cathode current collector 24 has a thickness of about 5 to 3 microns.

Cathode material 26 (such as lithium cobalt oxide, $LiCoO_2$, lithium manganese oxide, lithium iron phosphate, lithium vanadium oxide, lithium nickel oxide, and the like) is located on cathode current collector 24, and has a perimeter 28. Mixed metal oxides (for example, those that include combinations of the above mentioned metals), such as lithium nickel cobalt oxide, can also be used to fabricate cathodes. In embodiments of the present invention, cathode material 26 has a thickness of about 1 to 3 microns.

Anode current collector 30 is also provided, having a first surface 32, a second surface 33, and a perimeter 34. Anode current collector 30 is made from a conductive material such as copper, aluminum, nickel, iron, gold, silver, platinum, molybdenum, titanium, manganese, metal alloys, conductive ceramics, conductive semiconductors such as heavily doped polycrystalline silicon, and the like. In embodiments of the present invention, anode current collector 30 has a thickness of about 0.1 to 1 microns, or preferably about 0.5 microns.

Anode 36 is located on second surface 33 of anode current collector 30. The anode may be made from metals such as, for example, copper, nickel or aluminum and/or lithium and alloys thereof. In embodiments of the present invention, anode 36 has a thickness of about 1 to 3 microns. In an embodiment of the present invention, anode 36 is not initially provided as part of the battery construction as manufactured. In this embodiment, the cathode material 25 may, for example, comprise a lithium containing compound, and anode 36 is formed as an active anode that is a layer of lithium metal after assembly of the battery e.g., by the first charging of the battery. In other embodiments, lithium ions are intercalated into the anode structure in materials such as graphite.

Electrolyte layer 38 separates the cathode material 26 from the anode current collector 30 (and the anode 36, when present). Electrolyte layer 38 has a perimeter 40. In embodiments of the present invention, electrolyte layer 38 has a thickness of from about 0.1 to about 10 microns. In embodiments of the present invention, electrolyte layer 38 has a thickness of from about 1 to about 5 microns. Electrolyte layer 38 is in physical contact with both the cathodic components and the anodic components to allow movement of ions therebetween. An electrolyte does not conduct electrons. An electrolyte can be liquid. An electrolyte can also be a solid, semi-solid, or combination of a porous solid and liquid, through which ions can pass. In some embodiments the electrolyte will be substantially chemically inert or non-reactive with regard to the ion or ions and electrode materials that are used to generate current within a battery or cell. Electrolyte layer 38 may be made from any electrolyte material, such as LiPON and the like, which can be deposited as a glass film or layer through which lithium ions can pass if a source of lithium ions and a destination for the lithium ions is provided. It is specifically contemplated that electrolyte layer 38 may comprise one or more electrolyte materials, either blended or in two or more distinguishable layers. An example of a preferred multilayered electrolyte construction is described in U.S. patent application Ser. No. 11/458,091 entitled "THIN-FILM BATTERIES WITH SOFT AND HARD ELECTROLYTE LAYERS AND METHOD," which is hereby incorporated by reference in total for all purposes.

Insulation layer 42 is provided and has a perimeter 44. In embodiments of the present invention, insulation layer 42 has a thickness of from about 1 to about 10 microns. Insulation layer 42 is made from an electrically insulating material, such as photoresist (e.g., Shipley 220 photoresist; various polyimides from HD Microsystems, such as the 2720 series, which includes 2727, 2723, 2729; the 2770 series which includes 2770 and 2772; the 2730 which includes 2731 and 2737; the PIX Series which includes PIX-1400, PIX-3476, PIX-S200, PIX-6400; the 2500 series, which includes 2525, 2555, 2575 and 2556; and various other polymeric materials such as Cyclotene product numbers 3022-35, 3022-46, 3022-57 and 3022-63 from Dow Chemical Company; photodefinable silicones such as WL-5351 and WL-3010 from Dow Chemical Company; and UV curable epoxy such as 9001 from Dymax Corporation, or the like. In some embodiments, insulation layer 42 includes one or more materials such as silicon oxide, LiPON, aluminum oxide, polymer, silicon nitride, silicon oxynitride, boron nitride, ceramic, cermet, or other metal oxide, metal nitride, metal carbide, metal oxyboride, and/or metal oxynitride, wherein the metal is aluminum, indium, tin, indium-tin, zirconium, niobium, tantalum or other suitable metal, or other suitable electrical insulator. Insulation layer 42, together with electrolyte layer 38 separates the cathodic components (cathode material 26 and cathode current collector 24) from the anodic components (the anode current collector 30 and the anode 36, when present) of battery 10.

A first passivation layer 46 generally overlies at least the cathode material perimeter 28, electrolyte perimeter 40, and insulation layer perimeter 44. Passivation layers as described herein are made from conductive metals, such as from a conductive material such as copper, aluminum, nickel, iron, gold, silver, platinum, molybdenum, manganese, metal alloys, conductive ceramics, conductive semiconductors such as heavily doped polycrystalline silicon, and the like. In embodiments of the present invention, passivation layers have a thickness of from about 0.11 to about 5 microns. First passivation layer 46 is electrically coupled to cathode current collector 24 and additionally forms a continuous metal-to-metal seal 48 around a defined area of the cathode current collector 24. In embodiments of the present invention, the first passivation layer 46 and the cathode current collector 24 (or anode current collector in alternative embodiments of the present invention) are sealed with a metal-to-metal weld that has a width of about 20 to about 30 microns. First passivation layer 46 has a via opening 50.

Second passivation layer 52 is electrically coupled to anode current collector 30 through via opening 50 of first passivation layer 46.

In a preferred embodiment, the first surface 32 of the anode current collector 30 is substantially parallel to the first surface 22 of substrate 20. The second passivation layer 52 is electrically coupled to the anode current collector 30 on the first surface 32 thereof, either directly or by way of intermediate passivation layer 53. Intermediate passivation layer 53 may be conveniently provided by forming a single metal layer on top of insulation layer 42 and anode current collector 30, with subsequent separation of the thus formed metal layer into first passivation layer 46 and intermediate passivation layer 53.

The battery 10 is preferably further provided with an encapsulating material 54 on the second passivation layer 52 and other components of the battery. The encapsulation is desirable in order to protect the battery materials from exposure to water vapor, oxygen, and other environmental contaminants. Lithium in particular reacts readily with other elements and compounds. Because thin film batter components in are sensitive to exposure to environmental elements, the battery construction should be isolated from the outside world after production of the battery. The extra protection afforded by the construction of the present battery, and in particular in combination with encapsulation is very advantageous. The final encapsulation material preferably is an organic material as a silicone, polyimide, epoxy or other such polymer as discussed above. In an embodiment of the present invention, encapsulating material 54 thickness is about 8 to 10 microns. In an embodiment of the present invention, a final outer layer is silicon nitride, at a thickness of about 0.5 to 1 microns, which provides additional hermetic protection and is compatible with integrated circuit packaging materials. This final layer also serves as something of a physical barrier to abrasion and handling damage.

An exposed positive contact pad 56 is electrically connected to the cathode current collector 24 through first passivation layer 46 for attaching one or more electrical leads thereto. An exposed negative contact pad 58 is electrically connected to the anode current collector 30 through second passivation layer 52 and intermediate passivation layer 53 for attaching one or more electrical leads thereto.

In an embodiment of the present invention, the area of the cathode current collector 24 defines a lateral boundary 60 of the battery, and the positive contact pad 56 and the negative contact pad 58 are on or within the defined lateral boundary 60. Preferably, positive contact pad 56 and negative contact pad 58 are located outside of the area above the cathode, anode and electrolyte materials per se (that is, are not located above these materials). This is because the process of attaching an electrical lead can involve a physical force that could damage materials underlying the point of attachment.

In some embodiments, the battery of the invention includes a getter layer (not shown). A getter layer is generally described in U.S. Pat. No. 5,654,084 and is a layer that is intended to react with or adsorb at least one component of a deleterious substance in the environment to assist in preventing penetration of the barrier layer by the deleterious substance. For example, a layer containing titanium, tantalum, phosphorous, barium, erbium, rubidium, a titanium-zirconium alloy, cobalt oxide, carbon, hydrazine, sodium sulfite, or the like can be used to reduce transport of water or oxygen through protective layers of the battery.

As can be seen, this unique construction of the thin film battery provides protection of, in particular, the sides of the battery, because the first passivation layer 46 is sealed around a defined area of the cathode current collector 24 and forms a protective shoulder over the cathode material perimeter 28, electrolyte perimeter 40, and insulation layer perimeter 44. This configuration prevents adverse environmental exposure of edges of adjacent metal and non-metal layers that would provide a direct lateral pathway to sensitive components of the battery construction along a metal/non-metal interface.

The battery as shown in FIG. 1 can be described in another way, wherein a thin film battery 10 is provided comprising:
 a) a substrate 20 having a first surface 22;
 b) cathode current collector 24 on the first surface of the substrate 22;
 c) first passivation layer 46 electrically coupled to the cathode current collector 24 and forming a continuous metal to metal seal 48 around a defined area of the cathode current collector, the first passivation layer 46 having a via opening 50;
 wherein the first passivation layer 46 and the cathode current collector 24 define a generally enclosed area. The battery 10 additionally comprises:
 d) a cathode material 26;
 e) an anode current collector 30;
 f) an anode 36;
 g) an electrolyte layer 38, the electrolyte layer 38 separating the cathode material 26 from the anode current collector 30; and h) an insulation layer 42, the insulation layer 42, together with the electrolyte layer 38 separating the anode current collector 30 from the cathode material 26 and the cathode current collector 24. The cathode material 26, anode current collector 30, electrolyte layer 38 and insulation layer 42 are disposed within the enclosed area defined by the first passivation layer 46 and the cathode current collector 24.

As noted above, anode 36 is located on second surface 33. In an embodiment of the present invention, anode 36 is not initially provided as part of the battery construction as manufactured. In this embodiment, the cathode material 25 may, for example, comprise a lithium containing compound, and anode 36 is formed as an active anode that is a layer of lithium metal after assembly of the battery by charging the battery.

The battery 10 additionally comprises a second passivation layer 52 electrically coupled to the anode current collector 30 through the via opening 50 of the first passivation layer 46.

As noted above, exposed positive contact pad 56 and exposed negative contact pad 58 are electrically connected to the cathode and anode components, respectively, so that the battery can be electrically connected to a device in need of battery power. In some embodiments, the device in need of battery power is a circuit. The circuit may optionally include one or more of a processor, a memory, and an input device, an output device, and an antenna.

The contact pads are attached to an electrical lead by any suitable connective system, such as wirebond, solder, connection with conductive epoxy, etc. In an embodiment of the present invention, an apparatus is provided that comprises an electronic device; a thin film battery as described herein; and a housing holding the electrical device, wherein the battery cell is within the housing and supplies power to the electronic device.

A battery in accordance with the present description was prepared and stored in an uncharged state in a chamber at 85° C. and 85% humidity for one week. The battery was not stored in a sealed package, as is conventionally required for such batteries. After storage, the battery was charged and found to be fully functional.

All percentages and ratios used herein are weight percentages and ratios unless otherwise indicated. All patents, patent applications (including provisional applications), and publications cited herein are incorporated by reference as if individually incorporated for all purposes. Numerous characteristics and advantages of the invention meant to be described by this document have been set forth in the foregoing description. It is to be understood, however, that while particular forms or embodiments of the invention have been illustrated, various modifications, including modifications to shape, and arrangement of parts, and the like, can be made without departing from the spirit and scope of the invention.

What is claimed is:

1. A solid-state thin film battery comprising:
 a) a substrate having a first surface;
 b) a first current collector on the first surface of the substrate;
 c) a second current collector having a first surface and a perimeter, wherein one of the first and second current collector is an anode current collector and the other is a cathode current collector;
 d) a cathode material having a perimeter, the cathode material being located on the cathode current collector;
 e) a solid electrolyte layer having a perimeter, the electrolyte separating the cathode material from the anode current collector;
 f) an insulation layer having a perimeter, the insulation layer together with the electrolyte layer separating the anode current collector from the cathode material and the cathode current collector;

f) a first conductive metal layer generally overlying at least the perimeter of the cathode material, the perimeter of the electrolyte, and the perimeter of the insulation layer, the first conductive metal layer being electrically coupled to the first current collector and forming a continuous metal to metal seal around a defined area of the first current collector, the first conductive metal layer having a via opening; and g) a second conductive metal layer electrically coupled to the second current collector through the via opening of the first conductive metal layer.

2. The thin film battery, of claim 1, wherein the first current collector is the cathode current collector and the second current collector is the anode current collector.

3. The thin film battery of claim 1, wherein the first surface of the second current collector is substantially parallel to the first surface of the substrate, and wherein the second conductive metal layer is electrically coupled to the second current collector on the first surface of the second current collector.

4. The thin film battery of claim 1, wherein the first conductive metal layer is selected from copper, aluminum, nickel, iron, gold, silver, platinum, molybdenum, manganese, metal alloys, conductive ceramics and conductive doped polycrystalline silicon.

5. The thin film battery of claim 1, further comprising an encapsulating material surrounding the thin film battery; and having an exposed first contact pad electrically connected to the first current collector for attaching one or more electrical leads thereto, and having an exposed second contact pad electrically connected to the second current collector for attaching one or more electrical leads thereto.

6. The thin film battery of claim 5, wherein the area of the first current collector defines a lateral boundary of the battery, and the first and second contact pads are on or within the defined lateral boundary.

7. An apparatus comprising:
an electronic device;
a thin film battery of claim 1; and
a housing holding the electrical device, wherein the battery cell is within the housing and supplies power to the electronic device.

8. The thin film battery of claim 1, wherein the cathode material comprises a lithium containing compound, and a layer of lithium is formed as an active anode after assembly of the battery by charging the battery.

9. The thin film battery of claim 1, wherein the electrolyte comprises LiPON.

10. A solid-state thin film battery comprising:
a) a substrate having a first surface;
b) first current collector on the first surface of the substrate;
c) first conductive metal layer electrically coupled to the first current collector and forming a continuous metal to metal seal around a defined area of the first current collector, the first conductive metal layer having a via opening;
wherein the first conductive metal layer and the first current collector define a generally enclosed area;
the battery additionally comprising:
d) a cathode material;
e) a second current collector, wherein one of the first and second current collector an anode current collector and the other is a cathode current collector;
f) a solid electrolyte layer, the electrolyte separating the cathode material from the anode current collector; and
g) an insulation layer, the insulation layer together with the electrolyte layer separating the anode current collector from the cathode material and the cathode current collector;
the cathode material, second current collector, electrolyte layer and insulation layer being disposed within the enclosed area defined by the first conductive metal layer and the first current collector;
the battery additionally comprising
h) a second conductive metal layer electrically coupled to the second current collector through the via opening of the first conductive metal layer.

11. The thin film battery of claim 10, wherein the first current collector is the cathode current collector and the second current collector is the anode current collector.

12. The thin film battery of claim 1, wherein the battery comprises a positive contact pad and a negative contact pad, wherein the contact pads are located outside of the area above the cathode, anode and electrolyte materials of the battery.

13. The thin film battery of claim 1, wherein the first conductive metal layer has a thickness of from about 0.11 to about 5 microns.

14. The thin film battery of claim 10, wherein the first conductive metal layer has a thickness of from about 0.11 to about 5 microns.

* * * * *